April 7, 1942.  H. W. EBERHARDT  2,278,651
PRECISE INDEXING CHUCK
Filed May 29, 1940  3 Sheets-Sheet 1
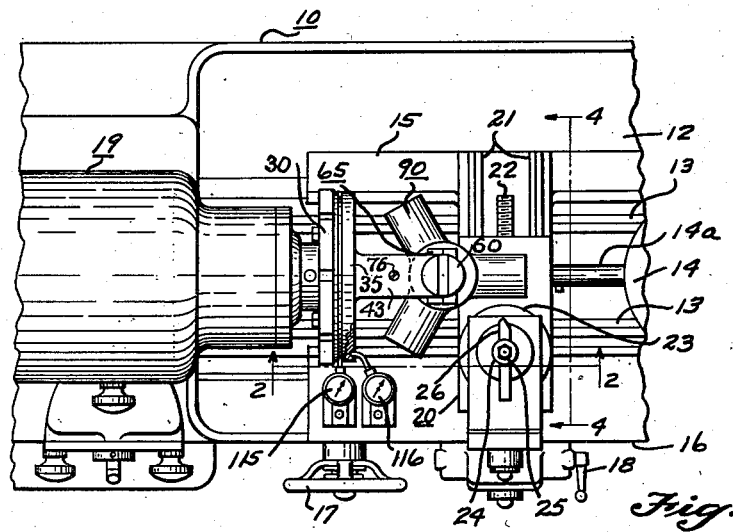
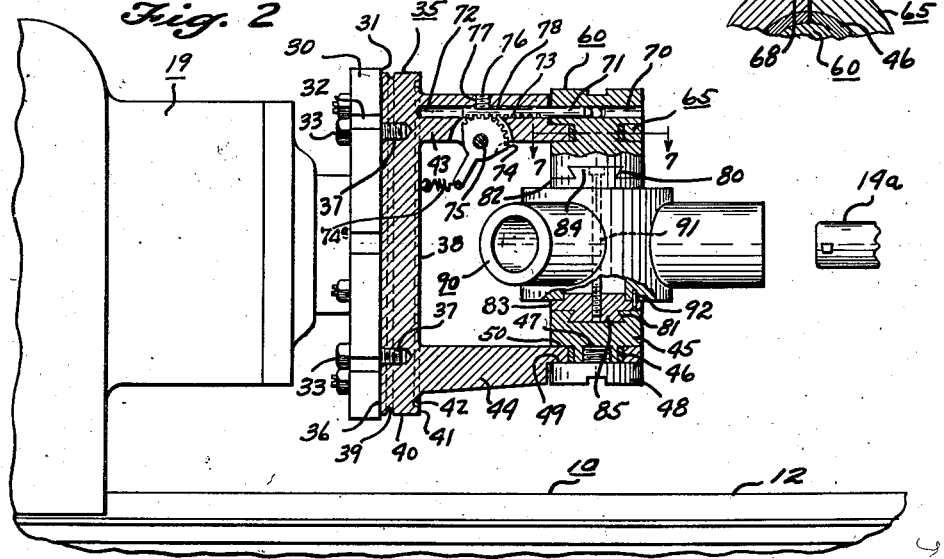
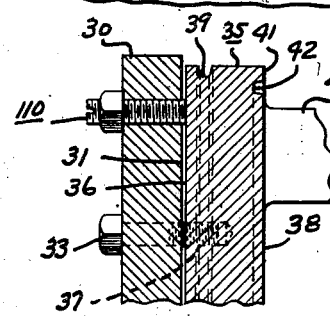
INVENTOR.
HERMAN W. EBERHARDT
BY
ATTORNEYS.

April 7, 1942.   H. W. EBERHARDT   2,278,651
PRECISE INDEXING CHUCK
Filed May 29, 1940   3 Sheets-Sheet 2
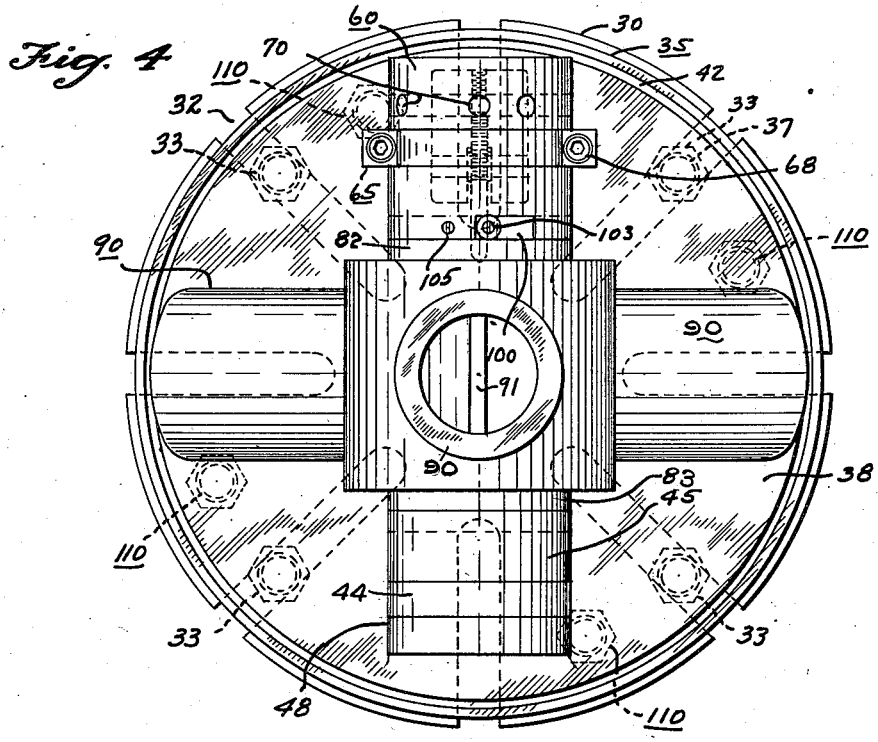
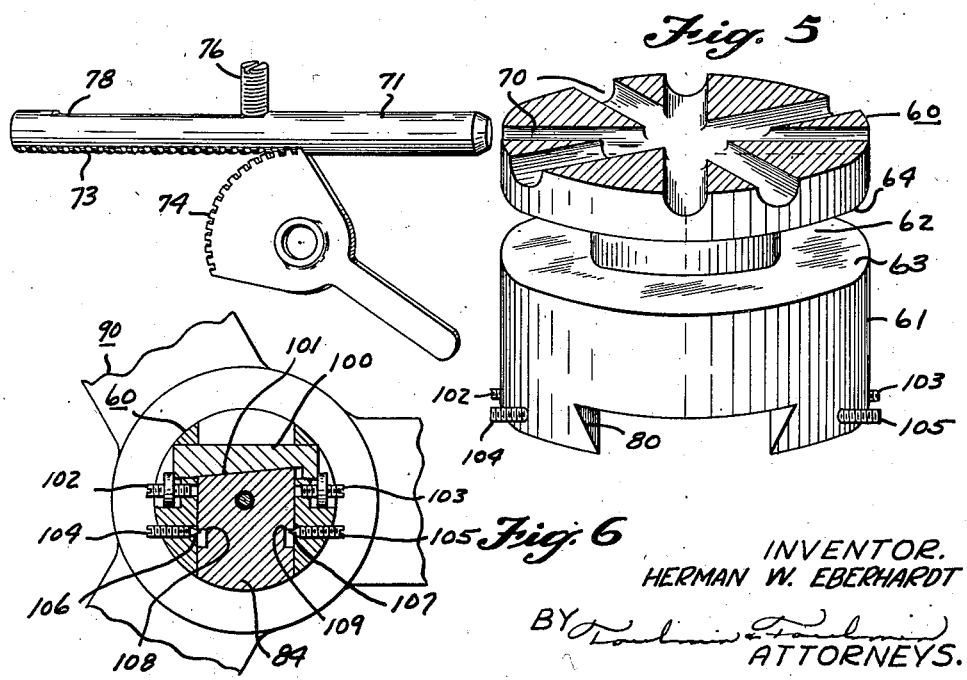
INVENTOR.
HERMAN W. EBERHARDT
BY
ATTORNEYS.

April 7, 1942.  H. W. EBERHARDT  2,278,651
PRECISE INDEXING CHUCK
Filed May 29, 1940  3 Sheets-Sheet 3
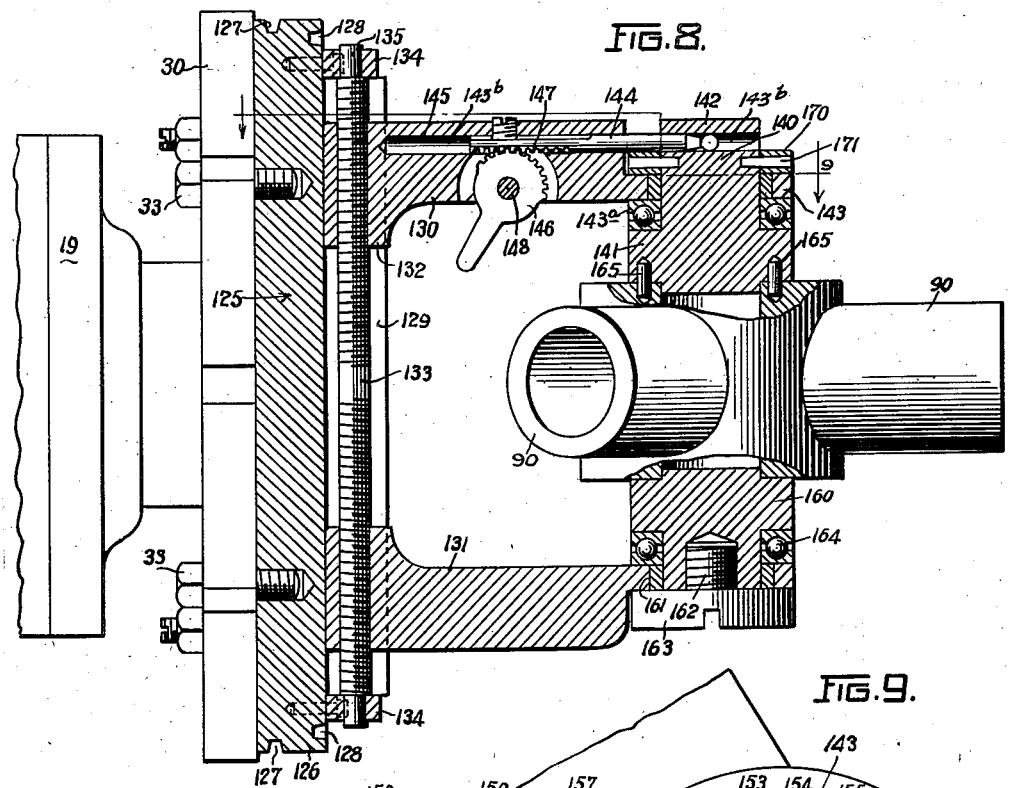
FIG. 8.
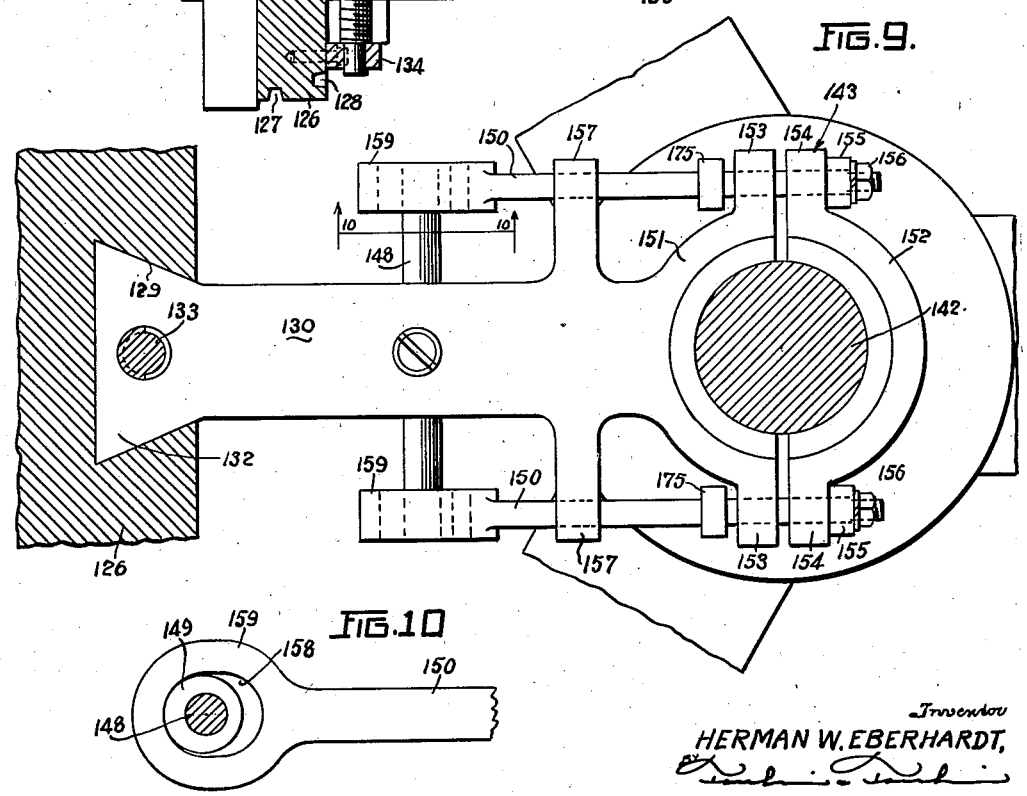
FIG. 9.
FIG. 10.
Inventor
HERMAN W. EBERHARDT,
Attorneys Patented Apr. 7, 1942

2,278,651

UNITED STATES PATENT OFFICE 2,278,651

PRECISE INDEXING CHUCK

Herman W. Eberhardt, Paterson, N. J.

Application May 29, 1940, Serial No. 337,874

9 Claims. (Cl. 279—5)

This invention relates to machine tools, and particularly to a chuck for holding a workpiece within a rotating machine such as a lathe.

An object of the invention is to provide a lathe chuck which will accurately retain a rotating workpiece in alignment with the axis of rotation of the lathe, and wherein the angular position of the workpiece with respect to the cutting tools of the lathe may be changed and accurately retained in the altered angular position.

Another object of the invention is to provide a workpiece holding chuck of such a construction that precise control is maintained over the angle of index of the workpiece with respect to the cutting tools of the lathe and to permit a plurality of these angular positions of the workpiece so that a plurality of operations may be performed upon the piece at definite angular relations with respect to each other.

A further object is to provide a work holding chuck wherein the indexing plate provides one of the work retaining members.

A further object of the invention is to provide, upon a lathe chuck, a means for testing the axial alignment of the chuck with respect to the axis of rotation of the lathe.

A still further object is to provide an arrangement whereby the axial alignment of the chuck may be altered with respect to the axis of rotation of the lathe in order to make the two axes coincide, and to provide means whereby the workpiece retained in the chuck may have the axis of rotation thereof aligned with the axis of rotation of the chuck.

A further object of the invention is to provide a lathe chuck, or work holding chuck, which will accurately retain a rotating workpiece in alignment with the axis of rotation of a lathe and wherein clamping arms are provided upon the chuck which are adjustable to permit clamping of the workpiece between the arms.

Another object of the invention is to provide a work holding chuck having an indexing plate whereby work may be positioned axially about the axis of the plate, and wherein means are provided to lock the indexing plate in position upon its axis.

It is a still further object of the invention to provide a work holding chuck having an indexing plate and means to support a work element with respect to the indexing plate, and to provide means for simultaneously coordinating movement of an engaging means for the indexing plate and a locking means therefore to cause simultaneous positioning and locking of the indexing plate.

Further objectives and advantages will be apparent from the following description and a reading of the drawings.

In the drawings:

Figure 1 is a top plan view of a lathe incorporating the chuck of this invention;

Figure 2 is a cross-sectional view taken along line 2—2 of Figure 1 wherein the chuck is shown in cross-section while the lathe parts are in elevation;

Figure 3 is a cross-sectional view showing a means for adjusting the chuck with respect to the face plate of a lathe;

Figure 4 is an elevational view of the chuck and face plate looking in the direction of line 4—4 of Figure 1.

Figure 5 is a perspective view showing the essential parts of the indexing plate, partially in cross-section;

Figure 6 is a cross-sectional view of the workpiece retaining device and shows means for adjusting the workpiece with respect to the retaining device;

Figure 7 is a partial cross-sectional view taken along line 7—7 of Figure 2.

Figure 8 is a cross-sectional view of a modified arrangement of the work holding chuck showing means to adjust the work holding arms and means to lock the indexing plate in position;

Figure 9 is a plan view partially in cross-section taken along line 9—9 of Figure 8;

Figure 10 is a cross-sectional view of the locking means for the indexing plate taken along line 10—10 of Figure 9.

In general, the device of this invention consists of a chuck which is adapted to be mounted upon a face plate of a lathe. The face plate is in turn positioned upon the live center extending from the head stock of the lathe and in which suitable mechanism is provided for rotating the live center and thus the face plate and the chuck. When turning articles upon which a plurality of operations are performed, and where the operations to be performed are to be displaced angularly around the circumference of the article, difficulty has arisen in accurately indexing an article so that successive articles machined would have the exact same angularity upon the various surfaces. This is particularly true under circumstances that have required the articles be removed from the machine some time during its process of manufacture and be returned to the machine for finishing. When removing the machine tool devices of former practice and replacing them upon a machine the precise position assumed by the device upon replacing the same upon the machine will not be the same as the former position.

The device of this invention is adapted to be mounted upon a face plate positioned upon the lathe. To align the chuck upon the face plate, accurately machined surfaces are provided against which micrometer indicating attachments can abut in order to determine the exact rotational center of the chuck and the exact plane of operation of the chuck at 90° from the axis of rotation of the chuck, whereby the chuck will be positioned accurately upon the face plate so that the centers of rotation of the face plate and chuck will coincide.

The chuck of this invention also is arranged to precisely and accurately index a work element retained in the chuck with respect to the working tools of the lathe in order to machine various surfaces of the workpiece at precise angles.

In this invention the chuck is shown in operation upon a lathe 10. The lathe bed 12 is provided with the ways 13, upon the upper surface thereof, upon which a tail stock (not shown) is positioned in order to slide to and fro along ways 13. Positioned upon the tail stock is a turret 14 wherein one or more working tools 14a may be secured for working upon a workpiece positioned in the lathe. A carriage 15 is mounted upon the ways 13 and is adapted to be moved longitudinally along ways 13 by means of a cross feed rod (not shown) through any of the well-known driving connections between a cross rod and a carriage mechanism. An apron 16 depends from the front portion of the carriage 15 and has mounted thereon suitable controls for operation of the carriage. The controls may consist of a hand wheel 17 which engages the cross feed rod (not shown) for moving the carriage 15 longitudinally along the ways 13. A carriage control lever 18 may also be provided for starting and stopping the operation of the carriage 15. A head stock 19 is positioned upon the bed of the lathe and is provided with suitable mechanism for driving the live center of the lathe. The turret 14 which is mounted upon the tail stock, which in turn is carried by the ways 13 of the lathe, is connected by conventional driving means with the operating mechanism of the lathe in order to advance and retract the turret, and the tools carried thereby with respect to the work carried upon the live center of the lathe. A cross slide 20 is mounted upon the carriage 15 and is adapted to be moved to and fro transversely of the carriage 15 upon the ways 21 by means of the cross feed screw 22. A compound tool rest 23 is carried upon the cross slide 20 and is provided with the usual tool post 24. A binder screw 25 is provided upon the tool post 24 for securing the tool 26 to the post 24 and the post to the compound tool rest 23.

A face plate 30 is positioned upon the live center extending from the head stock 19 in any of the well-known manners such as by screw threading the face plate 30 upon the live center. The face plate 30 is provided with a flat planar surface 31 which under all normal circumstances would be at right angles to the axis of rotation of the face plate. A plurality of slots 32 extend radially from near the center of the face plate 30 and provide means through which bolts 33 may extend in order to engage or secure a work element to the planar surface 31, whereby the element thus secured to the face plate will rotate in the same axis as the face plate.

In this invention a chuck 35 is provided with a planar surface 36 which is adapted to abut the planar surface 31 of the face plate 30. The bolts 33, extending through the face plate 30 extend into threaded engagement with the threaded openings 37 provided in the circular base 38 of the chuck 35 thereby securing the chuck 35 to the face plate 30. A groove 39 is cut in the edge surface 40 of the base 38 in such a manner that the bottom face of the groove 39 is in concentric relation with the axis of rotation of the base 38. In the exposed face surface 41 of the circular base 38 there is provided a groove 42 which forms an annular groove near the outer edge portion of the face surface. The bottom face of this groove 42 is a finished surface so that it will be in alignment in a plane at right angles to the axis of rotation of the base 38. The function of the grooves 39 and 42 will be hereinafter more fully described.

Extending from the base 38 are two arms 43 and 44. These arms extend vertically from the base in planar alignment and are positioned parallel with respect to each other. The arm 44 is provided with a work securing member 45 which is pivotally mounted in the bearing 46 positioned in the arm 44. A threaded screw member 47 having an enlarged head 48 is in threaded engagement with the work securing member. The enlarged head portion 48 of the screw threaded member 47 abuts a shoulder 49 on the arm 44. The work securing member 45 is also provided with a shoulder 50 which abuts the arm 44. The work securing member 45 is thus retained in a pivotal position upon the arm 44 by means of the shoulders 49 and 50.

An indexing plate 60 is pivotally mounted upon the arm 43 and has the axis thereof in alignment with the axis of the work securing member 45. The indexing plate 60 consists of a cylinder 61 having an annular groove 62 about the mid-portion thereof, thereby providing a lower shoulder 63 and an upper shoulder 64. The arm 43 is provided with a bearing 65 which is of the split bearing type consisting of two sections 66 and 67. The section 66 of the bearing 65 is integral with the arm 43 while the section 67 is bolted to the section 66 by means of the bolts 68 whereby a full bearing is provided in the annular groove 62 of the indexing plate 60.

The indexing plate 60 has a plurality of radially extending passageways 70. These passageways radiate from the axis of rotation of the indexing plate 60 and may be bored within the indexing plate 60 at any suitable angle, the angle being determined by the angularity required by the various indexing positions of the indexing plate 60. These passages 70 are accurately machined to a uniform size so that when a plunger 71 engages one of the passageways 70 a close sliding fit will result between the plunger 71 and the passage 70 since the plunger 71 has also been machined to close limits on the external diameter thereof. The plunger 71 extends into a bored passage 72 in the arm 43. This passage 72 is also machined to accurate limits so that the plunger 71 will slide in close engagement with the walls of the passage 72. A portion of the plunger 71 provides a gear rack 73 which is adapted to engage a gear segment 74 pivotally mounted upon a pin 75. The rack 73 and the gear segment 74 provide means whereby the plunger 71 may be advanced into one of the passages 70 in the indexing plate 60, or be retracted therefrom. The gear segment 74 may be operated manually to advance or retract the plunger 71 with respect to the indexing plate 60 to permit manual indexing of the plate 60, or automatic means could be provided for this operation. A tension spring 74a tends to retain the gear segment 74 and the plunger 71 in engaging position in the indexing plate 60. A set screw 76 is in threaded engagement with an opening 77 in the arm 43, the end of which is in engagement with the undercut portion 78 of the plunger 71. The undercut portion 78 of the plunger 71 in cooperation with the set screw 76 limits the travel of the plunger 71, and also prevents the plunger from sliding out of the passage 72 and through the indexing plate 60. Should it occur that a passage 70 extends transversely through the indexing plate 60.

The indexing plate 60 and the workpiece retaining member 45 are provided with the female halves of a dovetail slot 80 and 81, respectively. Adapter plates 82 and 83 are provided with the male halves 84 and 85 of the dovetail joints 80 and 81, respectively. These adapter plates 82 and 83 are secured to the workpiece 90 by any suitable means, the method of fastening the adapter plates 82 and 83 to the workpiece 90 is determined by the shape and size of the workpiece 90. As disclosed in Figure 2, the method of attaching a workpiece 90 to the adapter plates 82 and 83 consists of extending a bolt 91 between the adapter plates 82 and 83 and causing the bolt to be in threaded engagement with the adapter plate 83 whereby the workpiece 90 is clamped between the adapter plates. To insure that the workpiece will not rotate with respect to the adapter plates a locating pin 92 extends into the workpiece 90 and locates the plate on the work.

The male halves 84 and 85 of the dovetail joint extend into the female halves 80 and 81 of the dovetail joint whereby the adapter plates 82 and 83 of the workpiece 90 is positioned between the workpiece retaining member 45 and the indexing plate 60. The cooperating portions of the dovetail joint between the adapter plates and the work securing member 45 and the indexing plate 60 provide means whereby the adapter plates 82 and 83 may be slid transverse to the axis of rotation of the chuck 35 in order to align the axis of rotation of the workpiece 90 with the axis of rotation of the chuck 35. After the alignment of the rotational axes of the workpiece 90 and the chuck 35 have been established the adapter plates are secured into position to prevent misalignment of the axes.

The method of securing the adapter plates to the work supporting elements may be of any suitable type. However, I have shown an adjustable device in Figure 6 for aligning the axes of the workpiece 90 and the chuck 35. In this arrangement, which is the same for both the indexing plate 60 and the work securing element, a gib 100 extends transversely through the indexing plate 70 and a similar gib extends through the member 45 in planar alignment with the male halves 84 and 85 of the dovetail joints in the indexing plate 60 and the work securing member 45. The gib 100 is provided with a tapered face which cooperates with a correspondingly tapered face on the end of the male half of the dovetail joint 84 as at 101. Retaining screws 102 and 103 are provided at opposite ends of the gib 100 to locate the gib 100 transversely within the indexing plate 60. Set screws 104 and 105 are provided upon opposite sides of the male half 84 of the dovetail joint. These set screws are provided with tapered ends 106 and 107 which are adapted to engage the slots 108 and 109 positioned in the side walls of the male half 84 of the dovetail joint. The set screws 104 and 105 bind against the walls of the slots 108 and 109, respectively, to force the male half 84 of the dovetail joint into an engagement with the taper on the gib as indicated at 101.

It is thus seen that I have provided a device for adjusting the axis of rotation of the workpiece 90 with respect to the axis of rotation of the workpiece retaining member 45 and the indexing plate 60 whereby the two axes could be made to coincide. If the axis of rotation of the work element 90 and the axis of rotation of the work retaining members 45 and 60 coincide, the workpiece 90 will be on the axis of rotation of the circular base 38. In order to align the axes of rotation of the base 38 and the face plate 30 the base 38 may be shifted upon the face plate 30 until the two axes coincide. At which time the bolts 33 will be tightened in order to retain the base 38 in position upon the face plate.

In order to check the accuracy of the alignment of the chuck 35 with its base 38 upon the face plate 30 the grooves 39 and 42, heretofore described have been provided in the edge surface 40 and the face surface 41, respectively, of the base 38. The groove 39 has its finished bottom face concentric with the normal axis of rotation of the chuck 35 with its base 38. This groove provides a true running surface about the axis of rotation of the base 38 against which a micrometer indicating attachment can abut and a direct reading be taken of the degree of misalignment of the axis of rotation of the base with respect to the true axis of rotation of the face plate and thus of the lathe. If the axis of rotation of the base 38 should be out of alignment with the axis of rotation of the face plate and the lathe the bolts 33 can be loosened whereby the base 38 can be shifted to bring the axis of rotation into exact coincidence. While the axis of rotation of the base 38 and face plate 30 and thus the live spindle of the lathe may coincide, yet there is a possibility that the two axes may be angularly displaced. To check the angular displacement of the axis of rotation of the base 38 with respect to the axis of rotation of the face plate 30 the groove 42 is provided. This groove 42 has the bottom face thereof finished in a plane at exact right angles to the true axis of rotation of the rotation of the base 38, so that when a micrometer indicating instrument abuts the bottom face of this groove the indicator will indicate the exact angular displacement between the axes of rotation of the base 38 and face plate 30. To correct the angular displacement of these axes, a plurality of adjusting bolts 110 can be provided and spaced circumferentially in the face plate 30. These bolts 110 bear upon the planar face 36 of the base 38 whereby tightening of these bolts may angularly displace the base 38 with respect to the face plate 30 in order to correct the angular displacement therebetween. The bolts 33 are then tightened to retain the setting.

When the chuck 35 is to be used for holding a workpiece whereupon a plurality of operations are to be performed angularly displaced circumferentially around the workpiece the chuck 35 is positioned upon the face plate 30 and retained thereto by means of the bolts 33. A micrometer indicating attachment is positioned adjacent the slot 39 in the base 38 and has a protruding end thereof in engagement with the bottom face of the slot 39 as indicated at 115, see Figure 1. The chuck may then be rotated and the indicating attachment 115 will show the degree of rotational displacement of the axes between the chuck 35 and the face plate 30. A similar micrometer indicating attachment 116, see Figure 1, is positioned so that the protruding end thereof will extend into the slot 42 and abut the bottom face of the slot 42. This instrument 116 will indicate the angular displacement between the chuck 35 and the face plate 30. The retaining bolts 33 and the adjusting bolts 110 may be loosened or tightened to permit shifting of the base 38 of the chuck 35 until both the rotational and the angular misplacement of the axes between the chuck 35 and the face plate has been corrected. The chuck 35 will thus be on the exact rotational center of the live spindle extending from the head stock 19. The workpiece 90 with its adapter plates 82 and 83 may then be positioned within the workpiece retaining member 45 and the indexing plate 60. The axis of rotation of the workpiece 90 may then be adjusted in parallel relation with the axis of rotation of the chuck by means of the adjustable arrangement provided by the gib 100 and the set screws 104 and 105 to shift the axis of rotation of the workpiece 90 until it coincides with the axis of rotation of the chuck 35. The workpiece 90 is now centered with respect to a true axis of rotation of the live spindle extending from the head stock 19. The indexing plate has been previously prepared with the proper number of indexing passages 70 spaced at the proper angles through which the workpiece is to be indexed circumferentially while in position in the lathe. After one or more operations have been performed upon any one portion of the workpiece 90 the gear segment 74 is rotated to cause the rack 73 in the plunger 71 to retract the plunger from its passage 70 in the indexing plate 60, whereby the indexing plate may then be manually or automatically rotated to its next indexing position wherein the plunger 71 will again advance into the next successive proper passage, either automatically or manually, to position the workpiece 90 with respect to the cutting tools and the lathe.

It is obvious that the split bearing 65 can also be used as a means for clamping the indexing plate in position about its axis. After the plunger 71 has been extended into one of the passageways 70 to index the plate 60 about its axis and thus index the workpiece 90 to its next successive position, the split bearing 65 can have the portion 67 clamped upon the bearing throat of the indexing plate 60. The bolt 68 extending through the portion 67 of the split bearing 65 threadedly engages the portion 66, which is a part of the arm 43. It is seen that upon tightening the bolt 68 through the portion 66 of the split bearing 65, the portion 67 will be clamped upon the bearing throat of the indexing plate 60, thereby preventing the indexing plate from rotation about its axis while working upon the workpiece 90, thus relieving the plunger 71 of shearing strain.

In the modification disclosed in Figures 8 to 10, inclusive, the chuck 125 consists of a circular base 126 which is mounted upon a face plate 30 by means of bolts 33 in a manner similar to that disclosed with regard to the chuck 35. The The face plate 30 is carried upon the spindle of the lathe extending from the head stock 19 thereof. The circular base 126 is provided with a groove 127 within the edge surface thereof, and provides means whereby the concentricity of the chuck 125 may be checked against the axis of rotation of the spindle of the lathe. A groove 128 is provided within the face surface of the base 126 and is arranged as an annular ring near the outer edge of the circular base, and provides means for checking the angular displacement of the chuck with respect to the axis of rotation of the spindle of the lathe. These grooves thus function in the same manner as the grooves 39 and 42 of the chuck 35.

The base 126 has a dovetail slot 129 cut therein and arranged across the true diameter of the base. Arms 130 and 131 extend vertically from the base 126 and are arranged parallel with respect to each other and in planar alignment. The arms 130 and 131 are provided upon one end thereof with a dovetail shaped extending portion 132. This portion 132 cooperates with the dovetail shaped groove 129 in the base 126 to provide means for mounting the arms 130 and 131 upon the base 126 in sliding relation therewith.

A screw 133 extends through the male portion of the dovetail joints of the arms 130 and 131, and in threaded engagement therewith. One end of the screw 133 is provided with a left-hand thread while the opposite end is provided with a right-hand thread so that when the screw is rotated within its supporting bearing blocks 134, the arms 130 and 131 will be caused to move inwardly toward the central rotational axis of the chuck 125 or away therefrom. The arms 130 and 131 move simultaneously upon rotation of the screw 133 so that a work element, indicated at 90, may be clamped between extending portions of the arms 130 and 131 upon the rotational center of the chuck 125. The ends of the screw may be provided with a wrench socket as at 135.

An indexing plate 140 is rotatably mounted upon the arm 130. This indexing plate 140 consists of a cylindrical supporting member 141 which has a reduced end portion 142 extending through a split bearing 143 positioned upon the arm 130. The ball thrust bearing 143a is positioned between the cylindrical member 141 and the arm 130 and is carried upon the shoulder formed by the reduced end portion 142. This thrust bearing 143a assumes frictional resistance when the indexing plate 140 is to be rotated after a workpiece has been clamped within the chuck 125 in a manner hereafter described.

The upper end of the reduced end portion 142 is provided with a collar 170 which is secured thereto by means of the pins 171. The collar 170 engages the upper face of the split bearing 143 and retains the cylindrical supporting member 141 in position upon the arm 130. Also, this upper end portion 142 of the cylindrical member 141 is provided with a plurality of passageways 143b which extend radially from the axis of the member 141. These passageways are adapted to cooperate with a plunger 144 extending from within the arm 130, and which slides within a passage 145 provided in the arm 130. Passageways 143b and the plunger 144 are accurately dimensioned for retaining the indexing plate 140 within accurate angular displacements about the axis of the indexing plate in the same manner as the arrangement heretofore described with regard to Figure 2.

A gear segment 146 is adapted to cooperate with a gear rack 147 provided upon the plunger 144 to move the same to and fro within the passage 145. This gear segment 146 is bearinged upon a pin 148 which extends through the arm 130 upon both sides thereof and has mounted thereon an eccentric 149 (see Figure 10). The eccentrics 149 cooperate with the arms 150 which are in engagement with the movable portion of the split bearing 143.

The split bearing 143 consists of a stationary portion 151 and a movable portion 152. The stationary portion 151 is attached to the arm 130 and is provided with flanges 153 extending from opposite sides thereof through which the arms 150 extend in suitably bored holes. The arms 150 also extend through flanges 154 provided upon the movable portion 152 of the split bearing. A threaded collar 155 and a nut 156 are provided upon the end of the arms 150 and retain the movable portion 152 of the split bearing 143 upon the arms 150. Suitable flanges 157 extend from the arm 130 through which the arms 150 extend. The flanges 157 and 153 provide means for guiding the arms 150 in parallel relation so that the movable portion 152 of the split bearing 143 may be caused to engage or disengage the reduced end portion 142 of the indexing plate 140.

The eccentric 149 is positioned within a slot 158 provided within an enlargement 159 provided upon the ends of the arms 150. Since the eccentric 149 and the gear segment 146 are mounted upon the common shaft 148, it is thus seen that when the gear segment 146 is rotated either manually, or by automatic means, that the eccentric 149 will also be rotated whereby coordination of operation of the plunger 144 and the movable or locking half 152 of the split bearing 143 is produced.

To support a work element 90 within the chuck 125 and between the arms 130 and 131, the arm 131 is provided with a rotatably mounted support element 160 which is bearinged within the arm 131 as at 161. A machine screw 162, having an enlarged head 163, is in threaded engagment with the member 160 and retains the same upon the arm 131. A ball thrust bearing 164 is positioned between the supporting member 160 and the arm 131 to assume thrust produced when the arm 131 is moved to cause engagement of the support member 160 adjacent the workpiece 90.

To provide a means for properly positioning the workpiece 90 upon the indexing plate 140 so that the passageways 143b will bear the proper relationship with the various angular cuts to be produced upon the workpiece 90, the pins 165 are secured within the support member 141 and are adapted to engage suitably positioned holes within the workpiece 90.

The operation of the device is such that when a workpiece 90 is to be inserted within the chuck 125, the workpiece is brought adjacent the supporting members 141 and 160. A suitable wrench is inserted within the wrench socket 135 and the screw 133 rotated, whereby the arms 130 and 131 are advanced toward the workpiece 90 until the supporting members 141 and 160 are in engagement therewith. The pins 165 are aligned with the suitable holes in the workpiece 90 to properly arrange the workpiece upon the indexing plate 140. The screw 133 is then tightened to rigidly secure the workpiece 90 between the indexing plate and supporting element 140, 141 and the supporting member 160. It is thus seen that due to the clamping action of the arms 130 and 131 upon the workpiece 90, that considerable thrust is created between the rotatable members 141 and 160 and their supporting arms 130 and 131, respectively. To permit easy rotation of the workpiece while clamped in position within the chuck 125, the ball thrust bearing 143a and 164 assume this frictional thrust whereby when the plunger 144 is withdrawn from the passage 143b the workpiece 90 may be readily indexed to its next successive position.

Also, as heretofore mentioned, the movement of the plunger 144 by the gear segment 146 will also cause movement of the eccentric 149 to cause the same to release the arm 150 when the plunger 144 is retracted from the passage 143b in the indexing plate 140, thereby unlocking the indexing plate to permit same to be rotated. It thus follows that when the plunger re-engages the passage 143b, the eccentric 149 will assume the position disclosed in Figure 10 to thereby retract the arm 150 to cause the movable portion 152 of the split bearing 143 to engage the indexing plate 140 and retain the same from rotation. Collars 175 are provided upon the arms 150 to prevent too great a movement of the movable portion of the split bearing 152, thereby preventing the work from falling from the chuck when the split bearing is released to unlock the same for rotational movement.

It is thus seen that I have provided an indexing device for use upon lathes or other turning machines which will permit precise indexing of the angular displacement of the various operations around the circumference of a workpiece and wherein each workpiece applied to the device shall have the exact same angular displacement of the various turned elements thereof. It is also seen that I have provided a device which will permit removal of a workpiece from the turning machine and replacement thereof in the exact position which it had heretofore assumed on the machine, and that through the use of micrometer indicating devices working in cooperation with previously prepared checking surfaces that it is possible to precisely determine the position of the chuck and the workpiece upon the face plate of a turning machine.

While the form and embodiment disclosed in this application show a preferred form, yet it is desirable to cover all forms which fall within the scope of the following claims.

Having thus fully described my invention, what I claim as new and desire to secure by Letters Patent is:

1. In a work holding chuck, a frame comprising a base having parallel arms extending therefrom in planar alignment, a work securing means mounted in one of the extending arms for free rotation therein, an indexing plate mounted in the other arm for free rotation therein and providing a work securing means for cooperation with the first mentioned work securing means, said first work securing means and said indexing plate providing a pivotal axis for a work piece positioned therebetween, accurately bored passageways extending radially from the axis of the indexing plate at predetermined angles and in planar arrangement, an accurately bored passageway in the indexing plate mounting arm in planar alignment with said radial passages and in longitudinal alignment therewith when successive radial passages are indexed adjacent thereto, a reciprocable plunger slidably engaging said mounting arm passageway, and means to reciprocate said plunger into engagement with said radial passages when indexed adjacent thereto to accurately position the indexing plate upon its rotational axis.

2. In a machine tool, a chuck frame comprising a base having arms extending therefrom in planar alignment, means pivotally positioned on said arms for securing a work element therebetween in axial alignment with the base, one of said means comprising an indexing plate having a plurality of radially extending passageways therein, a pin slidably mounted within an arm and adjacent said indexing plate, a portion of said pin comprising a gear rack, a gear segment rotatively mounted adjacent said pin and in operative association with said gear rack and means to rotate said gear segment to advance or retract said pin with respect to a passageway in said indexing plate.

3. In a work holding chuck, a frame comprising a base having arms extending therefrom in planar alignment, a work holding means pivotally positioned on each of said arms, said work holding means being adapted to position a work element in axial alignment with the axis of said base, one of said means comprising an indexing plate, means engaging said indexing plate to axially position the same, and means binding said indexing plate against the support arm for the same for securing said indexing plate against rotation.

4. In a work holding chuck, a frame comprising a base having arms extending therefrom in planar alignment, a work holding means pivotally positioned on each of said arms, one of said means forming an indexing plate, means engaging said indexing plate to axially position the same, means binding the indexing plate against rotation for rigidly securing said indexing plate in axial position, and means to simultaneously operate said indexing plate engaging means and said binding means to cause binding and unbinding simultaneously with engagement and disengagement respectively.

5. In a work holding chuck, a frame comprising a base having parallel arms extending therefrom in planar alignment, one of said arms having a semi-circular shaped end portion forming one half of a split bearing, a half bearing forming the cooperating half of the split bearing, an indexing plate pivotally mounted in said split bearing, a work securing means pivotally mounted in the other arm and providing a cooperating work securing element, said work securing means and said indexing plate providing a pivotal axis for a work piece, and means for clamping said split bearing upon said indexing plate to prevent rotation thereof when the chuck is rotated.

6. In a work holding chuck, a frame comprising a base having parallel arms extending therefrom in planar alignment, a work securing means pivotally mounted in one of the extending arms, an indexing head pivotally mounted in the other arm and providing a cooperating work securing element, said head comprising end portions joined by an annular reduced diameter portion which serves as an axle for the indexing head, said work securing means and said indexing head providing a pivotal axis for a work piece, a plurality of accurately bored passageways in one of the end portions of said indexing head, said passageways extending radially from the axis of said head at predetermined angles and in planar arrangement, an accurately bored passageway in the indexing head mounting arm in planar alignment with said radial passages and in longitudinal alignment therewith when said radial passages are adjacent thereto, a reciprocable plunger slidably positioned within said mounting arm passageway, said plunger having a gear rack associated therewith, and an oscillatable gear in engagement with said rack to reciprocate said plunger into engagement with said radial passages for accurately positioning the indexing plate upon its rotational axis.

7. In a work holding chuck, a frame comprising a base having arms extending therefrom in planar alignment, means pivotally positioned on said arms for securing a work element therebetween in axial alignment with the base, one of said means comprising an indexing plate mounted within a split bearing carried by one of said arms, means engaging said indexing plate to axially position the same, means for clamping the split bearing upon said plate for rigidly securing said plate to said support arm, and means to simultaneously operate said indexing plate engaging means and said clamping means to cause clamping and unclamping concomitant with engagement and disengagement respectively.

8. In a work holding chuck, a frame comprising a base having arms extending therefrom in planar alignment, means pivotally positioned on said arms for securing a work element therebetween in axial alignment with the base, one of said means comprising an indexing plate mounted within a split bearing carried by one of said arms, a plurality of passageways in said indexing plate arranged radially from the axis thereof and in a common plane, a passageway in said indexing plate support arm in planar alignment with said radial passageways, and in longitudinal alignment therewith when said radial passageways are adjacent thereto, a reciprocable plunger slidably engaging said passageway in said support arm, means for clamping said split bearing upon said indexing plate for rigidly securing said plate to said support arm, and means to simultaneously reciprocate said plunger with operation of said clamping means, whereby said plunger engages and disengages said radial passageways concomitant with clamping and unclamping respectively of said bearing.

9. In a work holding chuck, a frame comprising a base having arms extending therefrom in planar alignment, means rotatably mounted in said arms for securing a work piece therebetween on an axis 90° from the axis of rotation of the chuck, one of said means comprising a cylindrical indexing head having a reduced diameter portion, a split bearing carried by one of said arms, the reduced diameter portion of said indexing head being associated with said split bearing for mounting said head upon said arm, a plurality of passageways extending radially from the axis of said head arranged in a plane through the enlarged portion of said head, plunger means reciprocably mounted in said indexing head support arm arranged for reciprocable association with said radial passageways, and means to reciprocate said plunger with respect said passageways.

HERMAN W. EBERHARDT.